United States Patent [19]

Hawkins

[11] Patent Number: 5,470,146
[45] Date of Patent: Nov. 28, 1995

[54] COUNTERCURRENT DRUM MIXER ASPHALT PLANT

[75] Inventor: Michael R. Hawkins, Prairie Village, Kans.

[73] Assignee: Standard Havens, Inc., Cedar Rapids, Iowa

[21] Appl. No.: 815,591

[22] Filed: Dec. 27, 1991

Related U.S. Application Data

[63] Continuation of Ser. No. 521,832, May 8, 1990, abandoned, which is a continuation of Ser. No. 158,853, Feb. 22, 1988, abandoned, which is a division of Ser. No. 879,996, Jun. 30, 1986, Pat. No. 4,787,938.

[51] Int. Cl.$^6$ .................................................. B28C 5/46
[52] U.S. Cl. ............................ 366/25; 34/137; 366/34; 366/57; 366/144; 366/175.3; 366/180.1; 432/111
[58] Field of Search ..................... 366/22, 23, 24, 366/25, 40, 45, 54, 56, 57, 58, 33, 34, 36, 144, 147, 180; 106/281.1, 273.1, 276; 423/307, 308, 309; 432/103, 105, 108, 111, 118; 404/79, 80, 92, 113, 72; 34/137

[56] References Cited

U.S. PATENT DOCUMENTS

| | | | |
|---|---|---|---|
| Re. 29,496 | 12/1977 | Dydzyk | 366/25 |
| Re. 30,685 | 7/1981 | Mendenhall | 106/281 R |
| Re. 31,904 | 6/1985 | Mendenhall | 366/25 |
| Re. 31,905 | 6/1985 | Mendenhall | 106/281 R |
| 35,469 | 6/1862 | Rand et al. | 366/219 |
| 466,882 | 1/1892 | Shettle | 366/147 |
| 657,799 | 9/1900 | Varney | 106/279 |
| 711,115 | 10/1902 | Lober | 106/273 R |
| 760,051 | 5/1904 | Amies | 106/280 |
| 938,698 | 11/1909 | Pine | 106/273 R |
| 1,096,103 | 5/1914 | Giesler | 366/8 |
| 1,185,117 | 5/1916 | MacMichael | 366/5 |
| 1,189,772 | 7/1916 | Ammann | 366/23 |

(List continued on next page.)

FOREIGN PATENT DOCUMENTS

| | | | |
|---|---|---|---|
| 35737 | 2/1926 | Denmark. | |
| 670727 | 1/1939 | Germany. | |
| 3109573 | 4/1982 | Germany. | |
| 3110380 | 9/1982 | Germany. | |
| 3423521 | 1/1986 | Germany | 366/22 |
| 0763661 | 9/1980 | U.S.S.R. | 432/105 |
| 0956690 | 9/1982 | U.S.S.R. | 366/22 |
| 258870 | 6/1927 | United Kingdom. | |
| 393454 | 6/1933 | United Kingdom. | |
| 456922 | 11/1936 | United Kingdom. | |
| 644247 | 10/1950 | United Kingdom. | |

OTHER PUBLICATIONS

Napa Recycling Report, vol. 2, No. 2, Mar., 1978.
National Seminar on Asphalt Pavement Recycling, Oct. 14–16, 1980, Dallas–Ft. Worth, Tex., Transportation Research Board, U.S. Dept. of Trans., "State–of–the–Art Hot Recycling" (Richard W. Smith), pp. 115–124.
National Seminar on Asphalt Pavement Recycling, Oct. 14–16, 1980, Dallas–Ft. Worth, Tex., Transportation Research Board, U.S. Dept. of Trans., "Equipment for Hot Recycling" (Douglas J. Brown), pp. 125–129.

(List continued on next page.)

*Primary Examiner*—Stephen F. Gerrity
*Attorney, Agent, or Firm*—Simmons, Perrine, Albright & Ellwood

[57] ABSTRACT

A drum mixer asphalt plant is provided with a rotatable cylinder 10 in which virgin aggregate, recycle material and liquid asphalt are mixed to produce an asphaltic composition and the hot gas stream for heating and drying the materials flow in countercurrent relation. In a first zone within the cylinder 10, aggregates are heated and dried by heat radiation and a hot gas stream generated at a burner head 46 of a combustion assembly 40. In a second zone within the drum cylinder 10 isolated from the burner flame and hot gas stream by the combustion assembly 40, liquid asphalt is sprayed from an injection tube 76 to mix with aggregate materials. A recycle feed assembly 60 delivers recycle asphalt material to the second zone also for mixing with the aggregate and liquid asphalt.

16 Claims, 2 Drawing Sheets

U.S. PATENT DOCUMENTS

| | | | |
|---|---|---|---|
| 1,210,510 | 1/1917 | Mason | 106/100 |
| 1,240,481 | 9/1917 | Popkess | 366/19 |
| 1,462,904 | 7/1923 | Finley | 366/74 |
| 1,639,276 | 8/1927 | Schutte | 404/79 |
| 1,774,649 | 9/1930 | Hepburn et al. | 366/7 |
| 1,834,963 | 12/1931 | Newhouse | 106/100 |
| 1,836,261 | 12/1931 | Madsen | 366/8 |
| 1,836,754 | 12/1931 | Hepburn | 366/25 |
| 1,894,808 | 1/1933 | Witte | 356/448 |
| 1,904,875 | 4/1933 | Metzgar | 165/159 |
| 1,954,997 | 4/1934 | Hirzel | 106/280 |
| 1,960,463 | 5/1934 | Taylor | 106/281 R |
| 2,003,861 | 6/1935 | McConnaughay | 106/280 |
| 2,017,632 | 10/1935 | Moody | 106/281 R |
| 2,028,745 | 1/1936 | Hendrick | 366/15 |
| 2,034,860 | 3/1936 | Dalin | 165/88 |
| 2,051,731 | 8/1936 | McConnaughay | 404/72 |
| 2,073,907 | 3/1937 | Scullin | 106/280 |
| 2,098,830 | 11/1937 | McElgin | 165/151 |
| 2,152,798 | 4/1939 | Fuller | 366/4 |
| 2,188,798 | 1/1940 | Smith | 366/12 |
| 2,218,476 | 10/1940 | Newhouse | 432/80 |
| 2,229,032 | 1/1941 | Ashley | 165/149 |
| 2,282,467 | 5/1942 | Faber | 366/58 |
| 2,298,016 | 10/1942 | Lincoln | 366/135 |
| 2,305,938 | 12/1942 | Turnbull | 366/25 |
| 2,308,245 | 1/1943 | Ortynsky | 106/173.1 |
| 2,315,022 | 3/1943 | Smith | 414/149 |
| 2,356,870 | 8/1944 | Miller | 106/282 |
| 2,411,634 | 11/1946 | Pearson | 106/235 |
| 2,421,345 | 5/1947 | McConnaughay | 366/25 |
| 2,444,413 | 7/1948 | Weston | 106/38.8 |
| 2,448,042 | 8/1948 | Miller | 366/149 |
| 2,487,887 | 11/1949 | McEachran | 366/1.5 |
| 2,572,068 | 10/1951 | Sommer | 106/280 |
| 2,626,875 | 4/1953 | McConnaughay | 106/277 |
| 2,639,651 | 5/1953 | Scott | 106/280 |
| 2,664,274 | 12/1953 | Worn | 165/84 |
| 2,687,290 | 8/1954 | Garoutte et al. | 106/100 |
| 2,701,213 | 2/1955 | Neville | 106/278 |
| 2,715,517 | 8/1955 | Bojner | 366/25 |
| 2,760,878 | 8/1956 | Lhorty | 106/280 |
| 2,796,118 | 6/1957 | Parker | 431/353 |
| 2,815,940 | 12/1957 | Madsen | 366/25 |
| 2,855,319 | 10/1958 | McConnaughay | 106/277 |
| 2,859,948 | 11/1958 | Callard | 165/82 |
| 2,871,774 | 2/1959 | Johnson | 404/32 |
| 2,879,862 | 3/1959 | Burden | 110/322 |
| 2,884,229 | 4/1959 | Francis et al. | 165/88 |
| 2,886,459 | 5/1959 | Lajoie | 106/282 |
| 2,923,538 | 2/1960 | Schoonover | 366/154 |
| 2,924,513 | 2/1960 | Altimier | 366/227 |
| 2,941,893 | 6/1960 | McConnaughay | 106/170 |
| 2,943,240 | 6/1960 | Martiney | 106/281 R |
| 2,969,956 | 1/1961 | Forgo | 165/175 |
| 2,977,864 | 4/1961 | Pullar | 404/32 |
| 2,989,291 | 6/1961 | Bedner | 366/56 |
| 3,021,566 | 2/1962 | Sommer | 366/155 |
| 3,093,595 | 6/1963 | Levy et al. | 106/277 |
| 3,106,384 | 10/1963 | Preeman | 366/22 |
| 3,161,927 | 12/1964 | Dietert | 366/17 |
| 3,249,452 | 5/1966 | Plumb | 106/281 R |
| 3,270,631 | 9/1966 | Bower | 106/277 |
| 3,271,240 | 9/1966 | Kari et al. | 106/273 R |
| 3,279,892 | 10/1966 | Lesser et al. | 165/89 |
| 3,306,237 | 1/1967 | Ransom | 437/72 |
| 3,352,702 | 11/1967 | Leithner et al. | 106/281 R |
| 3,357,689 | 12/1967 | Arnesen et al. | 366/106 |
| 3,423,222 | 1/1969 | McConnaughay | 366/24 |
| 3,539,369 | 11/1970 | Sapp | 106/280 |
| 3,540,709 | 11/1970 | Gardner | 432/111 |
| 3,544,077 | 12/1970 | Van Elten | 366/187 |
| 3,547,411 | 12/1970 | Sowell | 366/7 |
| 3,567,475 | 3/1971 | Rustler | 106/278 |
| 3,578,072 | 5/1971 | Kolm | 165/84 |
| 3,588,052 | 6/1971 | Scholtz | 366/228 |
| 3,614,071 | 10/1971 | Brook | 366/4 |
| 3,671,402 | 6/1972 | Wenzel | 201/15 |
| 3,693,945 | 9/1972 | Brock | 366/2 |
| 3,715,107 | 2/1973 | Paris | 366/6 |
| 3,741,532 | 6/1973 | Farnham | 366/141 |
| 3,788,609 | 1/1974 | Toczyski | 366/289 |
| 3,804,079 | 4/1974 | Schrader | 404/79 |
| 3,809,373 | 5/1974 | Brock | 366/18 |
| 3,813,853 | 6/1974 | Anderson | 55/96 |
| 3,822,866 | 7/1974 | Daester | 366/8 |
| 3,832,201 | 8/1974 | Shearer | 366/147 |
| 3,840,215 | 10/1974 | McConnaughay | 366/25 |
| 3,845,941 | 11/1974 | Mendenhall | 366/24 |
| 3,866,888 | 2/1975 | Dydzyk | 366/25 |
| 3,868,262 | 2/1975 | Ohlson | 106/281 R |
| 3,868,263 | 2/1975 | McConnaughay | 106/281 R |
| 3,892,045 | 7/1975 | Hage et al. | 432/36 |
| 3,904,723 | 9/1975 | Prince | 366/3 |
| 3,940,253 | 2/1976 | Zetterstrom | 110/212 |
| 3,950,861 | 4/1976 | Weimer | 432/118 |
| 3,971,666 | 7/1976 | Mendenhall | 366/144 |
| 3,975,002 | 8/1976 | Mendenhall | 366/114 |
| 3,999,743 | 12/1976 | Mendenhall | 366/4 |
| 4,000,000 | 12/1976 | Mendenhall | 106/281 R |
| 4,025,057 | 5/1977 | Shearer | 366/11 |
| 4,034,968 | 7/1977 | Mendenhall | 366/25 |
| 4,066,247 | 1/1978 | Mendenhall | 366/24 |
| 4,067,552 | 1/1978 | Mendenhall | 366/24 |
| 4,071,962 | 2/1978 | Saeman | 432/118 |
| 4,074,894 | 2/1978 | Mendenhall | 366/7 |
| 4,075,710 | 2/1978 | Jakob et al. | 366/25 |
| 4,089,508 | 5/1978 | Anderson | 366/7 |
| 4,095,284 | 6/1978 | Mendenhall | 366/7 |
| 4,095,285 | 6/1978 | Malbrunot | 366/23 |
| 4,096,588 | 6/1978 | Mendenhall | 366/7 |
| 4,103,350 | 7/1978 | Brock et al. | 366/22 |
| 4,104,736 | 7/1978 | Mendenhall | 366/2 |
| 4,106,110 | 8/1978 | Mendenhall | 366/2 |
| 4,126,397 | 11/1978 | Mendenhall | 366/7 |
| 4,130,364 | 12/1978 | Brown | 366/4 |
| 4,136,966 | 1/1979 | Mendenhall | 366/25 |
| 4,142,803 | 3/1979 | Mendenhall | 366/25 |
| 4,147,436 | 4/1979 | Garbelman | 366/25 |
| 4,153,471 | 5/1979 | Mendenhall | 106/281 R |
| 4,165,184 | 8/1979 | Schlarmann | 366/12 |
| 4,174,181 | 11/1979 | Garbelman | 366/2 |
| 4,177,080 | 12/1979 | Mendenhall | 366/25 |
| 4,182,631 | 1/1980 | Mendenhall | 106/281 R |
| 4,189,238 | 2/1980 | Mendenhall | 366/7 |
| 4,189,300 | 2/1980 | Butler | 432/118 |
| 4,208,131 | 6/1980 | Mendenhall | 366/7 |
| 4,211,490 | 7/1980 | Brock | 366/11 |
| 4,215,941 | 8/1980 | Mendenhall | 366/25 |
| 4,219,278 | 8/1980 | Mendenhall | 366/4 |
| 4,240,754 | 12/1980 | Mendenhall | 366/4 |
| 4,255,058 | 3/1981 | Peleschka | 366/25 |
| 4,256,506 | 3/1981 | Mendenhall | 106/280 |
| 4,265,546 | 5/1981 | Mendenhall | 366/7 |
| 4,298,337 | 11/1981 | Butler | 431/285 |
| 4,300,837 | 11/1981 | Malbrunot | 366/25 |
| 4,309,113 | 1/1982 | Mendenhall | 366/4 |
| 4,318,620 | 3/1982 | Malipier et al. | 366/25 |
| 4,326,809 | 4/1982 | Mendenhall | 366/4 |
| 4,332,478 | 6/1982 | Binz . | |
| 4,351,251 | 9/1982 | Brashears | 431/173 |
| 4,382,682 | 5/1983 | Mendenhall | 366/43 |

| | | | |
|---|---|---|---|
| 4,387,996 | 6/1983 | Mendenhall | 366/25 |
| 4,395,129 | 7/1983 | Musil . | |
| 4,398,826 | 8/1983 | Mendenhall | 366/25 |
| 4,427,376 | 1/1984 | Etnyre et al. | 366/25 |
| 4,439,040 | 3/1984 | Mendenhall | 366/2 |
| 4,477,250 | 10/1984 | Brashears | 432/72 |
| 4,480,922 | 11/1984 | Mendenhall | 366/25 |
| 4,481,039 | 11/1984 | Mendenhall | 366/4 |
| 4,515,090 | 5/1985 | Brashears | 110/264 |
| 4,522,498 | 6/1985 | Mendenhall . | |
| 4,555,182 | 11/1985 | Mendenhall | 366/25 |
| 4,600,379 | 7/1986 | Elliott | 266/25 |
| 4,616,934 | 10/1986 | Brock | 366/4 |
| 4,797,002 | 3/1989 | Heap | 366/228 |

OTHER PUBLICATIONS

National Seminar on Asphalt Pavement Recycling, Oct. 14–16, 1980, Dallas–Ft. Worth, Tex., Transportation Research Board, U.S. Dept. of Trans., "Denver's Method of Urban Hot Recycling" (William E. Smith), pp. 130–132.

National Seminar on Asphalt Pavement Recycling, Oct. 14–16, 1980, Dallas–Ft. Worth, Tex., Transportation Research Board, U.S. Dept. of Trans., "Rural Hot Mix Recycling" (Robert A. Welke, P. E.), pp. 133–139.

Napa Recycling Report, vol. 1, No. 2, Sep., 1977.

Asphalt Recycling (Adv.), CMI 1980 Recycle Review, p. 13, CMI Corporation, Oklahoma City, Okla., Winter 1981.

"CMI 1980 Recycle Review" CMI News, Winter 1981, CMI Corporation, Oklahoma City, Okla., pp. 6–12, 32.

"Asphalt & Asphalt Recycling", (No. 1 in Series), Better Roads, vol. 50, No. 3, Mar. 1981, pp. 15–26.

"Producing Recycled Asphalt Concrete Mixtures In Batch And Drum Mix Plants", Scherocman, James A., Barber—Greene Company, Aurora, Ill., Jul. 1, 1981.

Special Provisions of Recycling Bituminous Pavement (Optional), Michigan Dept. of Trans., Recycling Asphalt Pavement Conference, Univ. of Michigan, Mar. 25–26, 1980, p. 3, 141–145, 147–149, 151–153, 155–157, 159, 161.

"Hot Recyling with Batch Plants", Bechthold, Ned. W., Recycling Asphalt Pavement Conference, Univ. of Michigan, Mar. 25–26, 1980, pp. 165–167.

"Asphalt Recycling & Reclaiming Association Brochure: Hot Recycling Guidelines", AARA, Sep. 15, 1981, pp. 4–5.

"Recycling: Defined Examined; Types, Areas & Alternatives", (#3 in Series), Better Roads, vol. 51, No. 5, May, 1981, pp. 20–24, 30 34, 38 42.

"Evaluation of Air Pollution Control Devices for Asphalt Pavement Recycling Operations", Henley, Richard P., Progress Report for Project HR–188, Prepared for Iowa Highway Research Board, Dec., 1977, pp. 15–18.

"Recycling of Asphaltic Concrete Pavements", Belenson, Wade B., Interim Report, Utah Dept. of Transportation, Materials & Research Section, Bituminous Mix and Pavement Design Unit, Jul., 1978, pp. 5, 7–11, 13.

Progress Report on Recycling Bituminous Shoulders, –Ingberg, Richard C., Morchinek, Richard M., & Cassellius, Ronald H., Special Study 345, Physical Research Unit, Minnesota Dept. of Transportation, Nov. 1977 pp. 4, 5, 7, 10.

"Recycled Asphalt Concrete", Proudy, Henry; Hodge, James and Gregory, Galen. Implementation Package 75–5, State of Nevada, Carson City, Nev., Jul., 1975, pp. 1, 15–21, 32–33, 42–44.

"Washington State Dept. of Trans. First Asphalt Concrete Recycling Project—Renslow to Reygrass, LeClerc et al., Project No. 39, Ellensburg", Washington, U.S. Dept. of Trans., Arlington, Va., Jul., 1978, pp. 9–13.

"Recycling Asphalt Concrete Pavement", Hughes, Charles A., Rept. No. 524 1–F, State Dept of Highways & Public Transportation, Austin, Tex., Aug. 1977 pp. 16–36.

"Guidelines for Recycling Pavement Materials", Epps, J. A., Little, D. N. and Holmgreen, R. A., Nat'l Cooperative Highway Research Program Report 224, Transportation Research Board, Washington, D.C. Sep. 1980 pp. 30–35.

Iowa Manufacturing Company Sales Manual Section 2, Div. 1. Form 14959–IMCO–7–79, "Reclaimed Asphalt Attachment".

"Split–Feed Design Boosts Recycling Potential" Construction Equipment Jan., 1981, pp. 46–50.

"Recycling of Asphalt Concrete—Oregon's First Hot Mix Project", Dumler, James and Beecroft, Gordon, Interim Report for FHWA Demonstration Projects Division, Oregon Dept. of Transportation, Salem, Org., Nov., 1977 pp. 12–25.

"Recycling of Asphaltic Concrete—Arizona's First Project", McGee, James A. and Judd, A. James, Arizona Dept. of Transportation pp. 8–26.

"Recycling Asphalt Pavements", Brown, Douglas J. Interim Report on Hot Recycling. Demonstration Project No. 39, U.S. Dept. of Transportation, Arlington, Vir., Apr., 1979 pp. 7–17.

Napa Bulletin–Info Series 71, "Hot Recycling in Hot–Mix Batch Plants", Nat'l. Asphalt Pavement Association, Riverdale, Mo., May, 1981.

Manual Series, No. 20(MS–20), "Asphalt Hot–Mix Recycling", Chapter VI, The Asphalt Institute, College Park, Md., Aug., 1981 pp. 25–32 CH I., pp. 1–3, VI. 25–32.

"Recycling Asphalt Pavement—Iowa's Kossuth County Experience in 1976", Huisman, Charles L. Presented at 22nd NAPA Convention, San Francisco, Calif., Feb. 9, 1977, pp. 9–12.

CMI Adv. "CMI Unitized Drum Mix Plants. The Highly Portable Pollution–Free Asphalt Production Systems with a Practical Method of Recycling Reclaimed Asphalt." CMI Corporation, Oklahoma City, Okla., 1977.

"Method of and Apparatus for Asphaltic Concrete Hot Mix Recycling", Schlarman, Philip J., Pat. Appln. No. 831,154, filed Sep. 7, 1977. Portion of file history re: prior art.

"Air Pollution Control Standards", Quigley, John T., Presented at Recycling Pavements, Apr. 4–5, 1978, Univ. of Wisc.—Extension Dept. of Engineering, Madison, Wis., pp. 1–8.

"Okaloosa Asphalt: out with the old—in with the old", Van Natta, Jim. Dixie Contractor, Oct. 26, 1979, pp. 31–32.

"Huge Market Forecast for Recycled Asphalt", Mid–West Contractor, Aug. 23, 1978, pp. 34, 36–37.

"CMI Drum Mixer Producing for Thomas", Nicholson, Shauan P. Ohio Contractor, Sep. 1979 pp. 28–30, 33, 35.

"Hot Recycling: A State of the Art Report", California Builder & Engineer, Jul. 30, 1979., pp. 35 36, 45–46.

"Hot Asphalt Recycling—New Roads From Old", Highway & Heavy Construction, Jun., 1979 pp. 62–64, 66, 87.

"First Drier Drum Asphalt Plant in Southern California", California Builder & Engineer, Jul. 30, 1979., p. 22.

"Thermal Shield Development—A Summary Report", Benson, B. A. Boeing Construction Equipment Company, Nov., 1976.

"Evaluation of Recycled Asphaltic Concrete", Hughes, C. S. Final Report VHTRC 78–R9. Virginia Highway & Transportation Research Council, Charlottesville, Vir., Aug. 1977 pp. 1, 2, 6, 10, 11, 13, 15.

"Asphalt Recycling: A Dollar–Stretching Way to Improve Pavement", Williams, Ellis G. Reprint from West Virginia Construction News, Feb., Mar. & Apr., 1978. The Asphalt Institute, College Park, Md., May 1978.

Barber–Greene Manual p. 7690, "Barber–Greene Recycling Systems for Reclaimed Asphalt" Barber–Greene, Aurora, Ill. (undated).

"First Hot Mix Asphalt Recycling", California Builder & Engineer, Nov. 10, 1978 pp. 20–22.

"A Summer of Recycling—An Update on Asphalt Pavement Recycling", Smith, Richard W. Paving Forum, Winter 1978., pp. 5–9.

"Old Asphalt Sees New Youth as Recycling Comes of Age", ENR, Mar. 23, 1978., pp. 54–55.

"Iowa Job Offers another solution to recycling problem", ENR, Mar. 23, 1978 p. 55.

"Asphalt Recycling Gains Momentum", World Construction, May, 1978, pp. 48–50.

"Interstate 80 Recycle", AASHTO Quarterly, Jul., 1978.

Adv. from Highway & Heavy Construction, May 1978 Barber–Greene Recyclo O Mat System pp. 10–11.

Adv. from Highway & Heavy Construction, May., 1978 E. D. Etnyre & Co., Oregon, Ill.

Adv. from Highway & Heavy Construction, May, 1978 Iowa Manufacturing Company, Cedar Rapids, Iowa p. 55.

Adv. from Highway & Heavy Construction, May, 1978 Boeing Construction Equipment Co., p. 72.

"Median and Roadway Paved in One Pass", Highway & Heavy Construction, May, 1978 pp. 78–79.

"Drum Mixer Makes New, Recycled Asphalt", Highway & Heavy Construction, May, 1978, p. 149.

Adv. Iowa Manufacturing Company—"Cedarapids Drum Mixers & Recycling Systems Have Met All EPA Standards" Pacific Builder & Eng., May 5, 1978.

"Recycling Option", Michigan Contractor, May 13, 1979 p. GS–28.

"Two Projects Make Use of Hot Mix Recycling", Snyder, Guy. Michigan Contractor & Builder, Aug. 26, 1978 pp. 4–11.

"New Technology in Asphalt Recycling Offers Similar Opportunites in Canada", Brown, Jim Engineer & Contract Record, Aug. 1978 pp. 36–38.

"New Ideas in Asphalt", Byrne, Bob Western Construction, Oct. 1978 pp. 16–17, 2D–2I.

CMI Roto–Cycler, CMI Corporation, Oklahoma City, Okla. (undated).

NAPA Recycling Report "Hot Recycling: Algona (Kossuth County), Iowa Cedarapids Drum Mixer" vol. No. 3, Dec. 1977 National Asphalt Pavement Association Riverdale, Md.

Asphalt Plant Manual 3rd Ed., Mar. 1967. The Asphalt Institute, College Park, Md., Chapter III pp. 7–63.

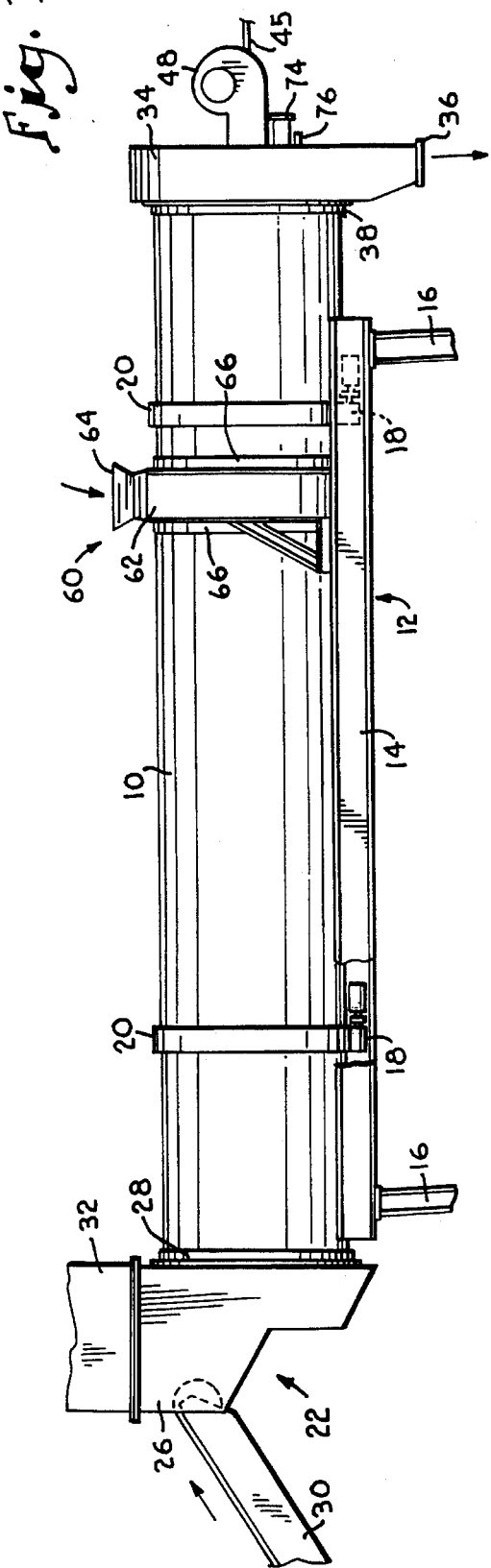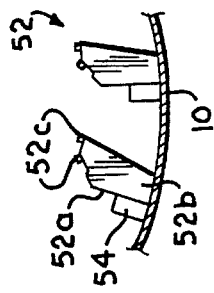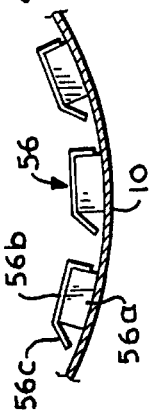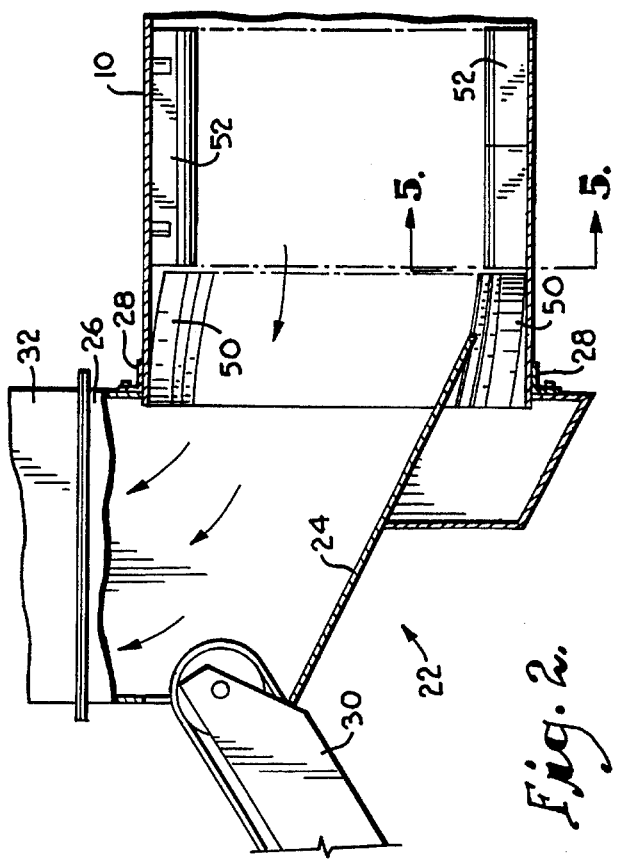

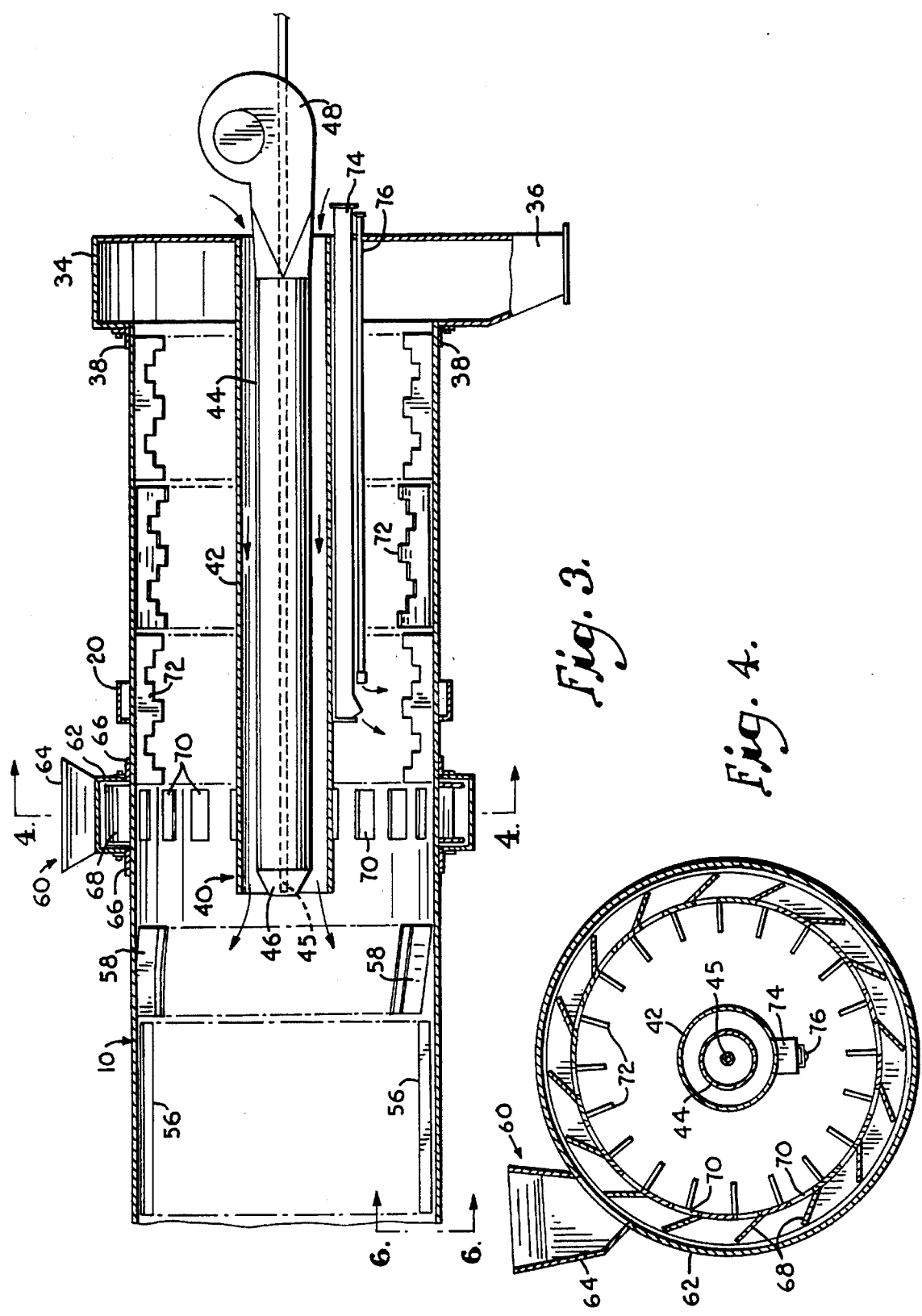

COUNTERCURRENT DRUM MIXER ASPHALT PLANT

This is a continuation of a application, Ser. No. 07/521, 832 filed May 8, 1990, now abandoned, which is a continuation of Ser. No. 07/158,853 filed Feb. 22, 1988, now abandoned, which is a division of Ser. No. 06/879,996 filed Jun. 30, 1986, now U.S. Pat. No. 4,787,938.

BACKGROUND OF THE INVENTION

This invention relates to a drum mixer asphalt plant used to produce a variety of asphalt compositions. More specifically, this invention relates to a drum mixer in which the region for the introduction of liquid asphalt and mineral fines, as well as recycle asphalt material, is isolated from hot combustion gases used to dry and heat the aggregate material.

Several techniques and numerous equipment arrangements for the preparation of asphaltic cement, also referred by the trade as "hotmix" or "HMA", are known in the prior art. Particularly relevant to the present invention is the production of asphalt compositions in a drum mixer asphalt plant. Typically, water-laden virgin aggregates are heated and dried within a rotating, open-ended drum mixer through radiant, convective and conductive heat transfer from a stream of hot gases produced by a burner flame. The prior art consistently teaches that the burner flame and the aggregate material are located at the same end of the drum mixer such that the hot gas stream and the aggregate material pass through the drum mixer in co-current flow.

As the aggregate material flows through the drum mixer, it is combined with liquid asphalt and mineral binder or "fines" to produce an asphalt composition. Exposing the liquid asphalt to excessive temperatures within the drum mixer or in close proximity with the burner flame causes serious product degradation, in addition to health and safety hazards. As a result, various attempts have been proposed to help minimize combustion of the liquid asphalt necessary in the process.

Paddles or flighting mounted on the interior of the mixer have been used to shield the liquid asphalt from the burner flame by creating a curtain of falling aggregate material disposed between the burner flame and the asphalt. While the flighting reduces the likelihood of combustion of the asphalt, the stream of hot gases emitted by the burner flame may still heat the asphalt to an excessive temperature. In such event, the more volatile components of the asphalt are released and the final product may become unfit for use in paving operations.

Excessive heating of asphalt compositions also results in a substantial air pollution control problem, known as "blue-smoke", caused when hydrocarbon constituents of asphalt are driven off and released into the atmosphere. Significant investments and efforts have been made by the industry in attempting to control blue-smoke emissions.

Improvement is also needed in those drum mixers which recycle asphaltic cement removed from road surfaces. In these mixers, the recycle material is ground to a suitable size and mixed with the virgin aggregate prior to mixing with the asphalt. The presence of asphalt in the recycle material creates essentially the same problems in asphalt production as does the presence of liquid asphalt. The volatile components of the asphalt are released upon exposure to high temperatures and carried in the exhaust gases to the air pollution control equipment, typically a baghouse. Within the baghouse, the blue-smoke or tiny particles of asphalt will condense on the filter bags reducing their efficiency and presenting a serious fire hazard. The useful life of the fabric filter used in the baghouse is also reduced when contaminated with asphalt.

The foregoing disadvantages and problem areas are characteristically compounded with the traditional requirement that the asphalt material with the drum mixer flows in the same direction (i.e., co-current flow) as the hot gases for heating and drying the aggregate. Thus, the asphalt component of recycle material and liquid asphalt itself is, by necessity, in direct contact with the hot gas stream and, in some instances, even the burner flame itself.

The need remains in the asphalt industry for improved drum mixer design and operating techniques to address the problems and drawbacks heretofore experienced. The primary objective of this invention is to meet this need.

SUMMARY OF THE INVENTION

More specifically, an object of the invention is to provide a drum mixer which effectively isolates liquid asphalt from the radiant heat flux of a burner flame and a stream of hot gases produced therefrom.

Another object of this invention is to provide a drum mixer which may be used with recycle material and which effectively isolates the recycle material from the burner flame and hot gases.

An additional object of the invention is to provide a drum mixer of the character described which is both safe and economical in operation. Efficient operation results in improved fuel consumption and in reduced air pollution emissions.

A corollary object of the invention is to provide a drum mixer of the foregoing character which is quieter in operation to render a safer work environment for asphalt workers and to render the asphalt plant less objectionable by community standards.

A further object of this invention is to provide a drum mixer of the type described which reduces the amount of hydrocarbons released to the environment.

It is a still further object of this invention to provide a drum mixer of the type described which reduces the amount of hydrocarbons entrained in the hot gas stream and carried to the air pollution control equipment.

Other and further objects of the invention, together with the features of novelty appurtenant thereto, will appear in the description of the drawings.

In summary, a drum mixer is provided with a rotatable cylinder in which aggregates, recycle materials and liquid asphalt are mixed to produce an asphaltic composition. Within a first zone in the drum cylinder, virgin aggregate is heated and dried by heat radiation and the stream of hot gases produced by a burner flame flowing in countercurrent flow to the aggregate itself to establish a highly beneficial heat transfer relationship. Toward the discharge end of the drum cylinder, a second zone is defined in which recycle materials are added and in which liquid asphalt is then mixed with the aggregates. An elongated combustion assembly is interiorly disposed within the drum cylinder along the central axis thereof and extends from the discharge end of the drum through the mixing zone to segregate the hot gases from the asphalt to prevent degradation of the final product. The hot gas stream is withdrawn from the drum cylinder at the upstream or inlet end thereof and delivered by ductwork to air pollution control equipment. Accordingly, the liquid asphalt, recycle material and virgin aggregate are mixed within the drum in an annular region between the drum cylinder and the combustion assembly where contact with the burner flame or with the hot gas stream is eliminated.

BRIEF DESCRIPTION OF THE DRAWINGS

In the following description of the drawings, in which like reference numerals are employed to indicate like parts in the various views:

FIG. 1 is a side elevational view of an asphalt plant drum mixer constructed in accordance with a preferred embodiment of the invention, and shown connected to the aggregate feed conveyor, burner assembly and exhaust gas ductwork;

FIG. 2 is an enlarged sectional view of end of the drum mixer connected with the aggregate feed conveyer and the exhaust gas ductwork;

FIG. 3 is an enlarged sectional view of end of the drum mixer connected with the burner assembly;

FIG. 4 is an enlarged sectional view taken through the recycle feed assembly along line 4—4 of FIG. 3 in the direction of the arrows;

FIG. 5 is an enlarged fragmentary view taken along line 5—5 of FIG. 2 in the direction of the arrows to illustrate the details of the flighting associated with the indicated material handling zone; and FIG. 6 is an enlarged fragmentary view taken along line 6—6 of FIG. 3 in the direction of the arrows to illustrate the details of the flighting associated with the indicated material handling zone.

DETAILED DESCRIPTION OF THE DRAWINGS

Referring now to the drawings in greater detail, the asphalt equipment of this invention includes a substantially horizontal drum cylinder 10 carried by a ground engaging support frame 12.

The framework 12 comprises spaced apart, parallel beams 14 inclined from a horizontal orientation and supported by vertical legs 16. Mounted on the parallel beams 14 are plurality of motor driven rollers 18 which supportingly receive trunnion rings 20 secured to the exterior surface of the drum cylinder 10. Thus, rotation of the drive rollers 18 engaging the trunnion rings 20 causes the drum cylinder 10 to be rotated on its longitudinal axis.

Located at the inlet or upstream end of the drum cylinder 10 is a substantially closed feed chute 22 illustrated in FIGS. 1 & 2. The feed chute 22 is fabricated as a fixed housing having a circular opening to receive the inlet end of the drum cylinder and a bearing seal 28 bolted to the outer wall of the feed chute 22 to permit rotation of the drum cylinder 10 within the feed chute 22. The forward wall of the feed chute 22 has an opening penetrated by the discharge end of a material conveyor 30 adapted to deliver aggregate to the feed chute 22 from a storage hopper or stockpile (not shown). The end of the material conveyor 30 is positioned above an inclined slide plate 24 of the feed chute 22 which extends into the open inlet end of the drum cylinder to direct aggregate received from the material conveyor 30 into the drum cylinder 10.

The upper end of the feed chute 22 includes a flanged exhaust port 26 connected to ductwork 32, a portion of which is shown in FIGS. 1 & 2, leading to conventional air pollution control equipment, such as a baghouse, to remove particulates from the gas stream.

Located at the outlet end of the drum cylinder 10, as illustrated in FIGS. 1 & 3, is a discharge housing 34. The discharge housing 34 includes a circular opening to receive the outlet end of the drum cylinder 10 and a bearing seal 38 bolted to the wall of the discharge housing 34 to permit rotation of the drum cylinder 10. The lower portion of the discharge housing 34 is fabricated as a funnel or discharge mouth 36 to direct asphaltic composition from the drum cylinder 10 to a material conveyor (not shown) for delivery of the product to a storage bin or transporting vehicle.

As best shown in FIG. 3, a combustion assembly 40 extends through the discharge housing 34 and into the drum cylinder 10. The combustion assembly 40 includes an elongate secondary air tube 42 which at one end thereof extends through the discharge housing to establish atmospheric communication and which centrally penetrates the drum cylinder 10 to coincide with the longitudinal axis thereof. The secondary air tube 42 is roughly one-third the length of the drum cylinder 10 itself, although this relative dimension may be varied as necessary.

Received within the secondary air tube 42 is a primary tube 44 having a burner head 46 on the innermost end thereof. Concentrically disposed within the primary tube 44 is a fuel line 45 which is connected to an exterior fuel supply (not shown). The primary tube 44 is of smaller diameter than the secondary air tube 42 to form an annulus therewith in which secondary air is drawn from the outside, as indicated by the arrows, to support combustion at the burner head 46. Fitted to the opposite end of the primary tube 44 is a blower 48 to force blower air through the primary tube 44 to the burner head 46. As the primary blower air is discharged from the burner head 46, it atomizes fuel from fuel line 45 to maintain a burner flame directed longitudinally into the drum cylinder 10.

At different regions throughout the interior of the drum cylinder 10 are fixed various types of flightings or paddles for the alternative purposes of lifting, mixing, guiding and stirring the material contained within the drum cylinder 10. The actions of the various flightings are known to those skilled in the art and, accordingly, the flightings now disclosed are intended as workable embodiments but are not exhaustive of the various combinations which could be utilized with the invention.

At the inlet end of the drum cylinder 10, slanted guide paddles 50 are fixed to the interior of the cylinder to direct material from the feed chute 22 inwardly to bucket flighting 52.

The bucket flighting 52 is arranged in longitudinal rows with the axis of the drum cylinder 10. An end view of two rows of bucket flighting 52 is shown in FIG. 5. Each open-topped bucket 52 forming the flighting includes a bottom plate 52a supported by brackets 54 from the interior wall of the drum cylinder 10. Spaced apart bucket side walls 52b are joined to the bottom plate 52a. Mounted on the outermost ends of the bucket side walls 52b are parallel bars 52c which form elongate slot openings on the sides of the buckets 52 innermost within the drum cylinder 10. So configured and arranged, when the drum cylinder 10 is rotated, aggregate material in the bottom of the drum cylinder 10 will be picked up by the bucket flighting 52. As the bucket flighting 52 rotates upwardly, material first begins to fall through the elongate openings formed by the parallel bars 52c connected to the bucket side walls 52b. As the bucket flighting 52 rotates further upward, then material begins to spill out from the open top of the bucket 52 and all the material is discharged therefrom as the bucket 52 descends back to the bottom of the drum cylinder 10.

Downstream of the bucket flighting 52, low-profile combustion flighting 56 as shown in FIG. 6 is mounted to the inner surface by brackets 56a and comprise L-shaped plates 56b having an outwardly and downwardly projecting flange 56c. The L-shaped plates 56b are mounted with the cavity formed by the shape of the plate facing the interior wall of the drum cylinder 10, and with the length of the plate extending along the longitudinal axis of the drum cylinder 10. The aggregates are carried around the inner surface of 10 by the combustion flighting 56 as the cylinder rotates, without creating a falling curtain of material as is the case with the bucket flighting 52.

At the end of the combustion flighting 56, slanted guide plates 58 are fixed to the interior of the cylinder to direct material from the heating and drying zones of the drum cylinder 10 previously described into the mixing zone in the annulus formed by the drum cylinder 10 and the secondary air tube 42.

Downstream of the end of the burner head 46 is located the recycle feed assembly 60 by which recycle asphalt material may be introduced into the drum cylinder 10. A stationary box channel 62 encircles the exterior surface of the drum cylinder 10 and includes a feed hopper 64 providing access to the interior of the box channel 62. Bolted to the side walls of the box channel 62 are angular bearing seals 66 to permit rotation of the drum cylinder 10 within the encircling box channel 62. Secured to the outer wall of the drum cylinder 10 and projecting into the space defined by the box channel 62 are a plurality of scoops 68 radially spaced around the drum cylinder 10. At the bottom of each scoop 68 is a scoop opening 70 through the wall of the drum cylinder to provide access to the inside of drum cylinder 10. Thus, recycle asphalt material, as indicated by the arrow in FIG. 1 may be delivered by conveyor (not shown) to the feed hopper 64 and subsequently introduced into the interior of the drum cylinder 10 through the scoops 68 rotating within the box channel 62.

Downstream of the recycle feed assembly 60, the interior surface of the drum cylinder 10 includes staggered rows of sawtooth flighting 72. The sawtooth flighting 72 is fixed upright on the drum cylinder 10 and comprises upright plates having irregular step-type upper surfaces to mix and stir material within the annulus of the cylinder and secondary air tube 42. At the end of the mixing zone is located the discharge housing 34 as previously discussed.

A screw conveyor 74 is mounted beneath the secondary air tube 42 within the drum cylinder 10 and extends through the discharge housing 34. The screw conveyor 74 is connected to conventional equipment (not shown) for feeding binder material or mineral "fines" to the mixing zone. Positioned alongside the screw conveyor 74, and likewise extended through the discharge housing 34, is an asphalt injection tube 76. The asphalt injection tube 76 is connected to conventional equipment (not shown) for spraying liquid asphalt in the mixing zone of the drum cylinder 10.

In operation, virgin aggregate from stockpile inventories is introduced by the material conveyor 30 to the feed chute 22. The aggregate falls onto the slide plate 24 of the feed chute 22 and is delivered to the drum cylinder 10 as it is rotated by drive rollers 18. The guide paddles 50 direct the aggregate downstream to the bucket flighting 52 with rotation of the drum cylinder 10. In the region of the bucket flighting 52, this flighting lifts and drops the aggregate to create a curtain of falling aggregate across the interior of the drum cylinder 10.

At the combustion assembly 40, primary air and fuel are forced by the blower 48 through the fuel tube 44 to the burner head 46. A radiant flame from the burner head 46 is directed into a combustion zone of the drum cylinder 10. Within the combustion zone, the flighting is of the combustion flighting 56 type to confine the aggregate largely to the interior wall of the drum cylinder 10 to ensure that the flame is not extinguished. Material is thus exposed to the radiant heat flux of the flame, but the flighting design prevents the discharge of material directly through the visible portion of the flame.

The hot gas stream generated by the flame at the burner head 46 flows through the interior of the drum cylinder 10 to the inlet end of the drum cylinder 10 to heat and dry aggregate material. The hot gas stream passes through the curtain of falling aggregate developed by the bucket flighting 52 and into the feed chute 22. The gas stream and any dust particles which may be entrained in the gas pass through the exhaust port 26 of the feed chute 22 to air pollution control equipment, such as a baghouse, where the dust is removed from the process gas by fabric filtration.

The inclined orientation of the drum cylinder 10 causes the aggregate to move downstream through the heating, drying and combustion region. The heated and dried aggregate is delivered to the guide plates 58 which direct the material in contact with recycle asphalt fed from the recycle feed assembly 60. Recycle asphalt is delivered by conveyor through the feed hopper 64 to the box channel 62 around the drum cylinder 10. The recycle material is then picked up by the scoops 68 and delivered through a scoop opening 70 to the interior of the drum cylinder 10. It should be noted that the location of the recycle feed assembly 60, the direction of flow of the combined aggregate and recycle material within the drum cylinder 10, and the secondary air tube 42 shield the recycle material from any contact with the flame from the burner head 46 and the generated hot gas stream.

The aggregate and recycle material are then mixed and stirred by the sawtooth flighting 72 in the annulus formed by the secondary air tube 42 and drum cylinder 10. Dust binder or mineral fines are delivered through the screw conveyor 74 while liquid asphalt is sprayed through the injection tube 76. The aggregate, recycle, binder and liquid asphalt are therefor combined in intimate admixture to form an asphaltic composition directed to the discharge mouth 36 of the discharge housing 34. The final asphaltic product may then be held in temporary storage facilities or delivered to a transport vehicle for use in pavement construction.

As in the case with the recycle material, the liquid asphalt and the mineral fines are effectively isolated from the flowing hot gas stream within the drum cylinder 10. Since the normally troublesome materials of asphalt production, such as the recycle material, liquid asphalt and dust binder, are shielded from contact with the flame of the burner head 46 and with the hot gas stream, degradation of the asphalt is virtually eliminated. Such a highly desirable result is achieved by advantageously locating the recycle feed assembly 60, the dust binder screw conveyor 74, and the liquid asphalt injection tube 76, by countercurrent flow of the hot gas and asphalt production constituents, and by the secondary air tube 42 shield the volatile components.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described my invention, I claim:

1. Apparatus for manufacturing an asphaltic composition, comprising:

a single inclined cylindrical rotatable drum having an upper inlet end and a lower discharge end, and including means disposed about an inner wall of the drum for advancing aggregate materials for inclusion in the asphaltic composition to move in a generally longitudinal, downstream direction away from the upper inlet end and toward the lower discharge end in response to rotation of said drum, said means for advancing aggregate materials including first flighting means for creating a falling curtain of said aggregate materials in an upstream portion of the drum, second flighting means for mixing and stirring said aggregate materials disposed in a downstream portion of the drum adjacent to the lower discharge end, and third flighting means disposed downstream of said first flighting means and upstream of said second flighting means for confining said aggregate materials generally to the inner wall of the drum;

means for rotating said drum;

first housing means, disposed about and receiving the inlet end of the drum, for placing virgin aggregate material into said upper inlet end of said drum for movement in said downstream direction towards said lower discharge end, and for exhausting gases;

a burner head for a combustion source of hot gases mounted within said drum intermediate said upper inlet and lower discharge ends and disposed upstream of said second flighting means and downstream of said third flighting means to divide said drum into a heating zone upstream from said burner head and a mixing zone downstream from said burner head, the burner head disposed for gas discharge toward the upper inlet end and for directing a stream of hot gases from said burner head in a counterflow direction with respect to the downstream movement of said virgin aggregate material in said heating zone to flow out of the drum through the first housing means, and away from said mixing zone, whereby said mixing zone will be free from the presence of said hot gas stream;

means, extending into the drum to the burner head, for supplying fuel and forced combustion air to the burner head to maintain a burner flame longitudinally within the drum and within said heating zone having said third flighting means;

second housing means, disposed at the lower discharge end of the drum and receiving the lower discharge end of the drum, and including discharge means for directing an asphaltic composition from the drum and for discharging said asphaltic composition through said discharge means;

secondary air tube means, penetrating said second housing means and extending centrally into the drum to the burner head and receiving said fuel and forced combustion air supply means therein and forming with the drum an annulus, for establishing secondary, atmospheric air flow to said burner head within said air tube means through the drum from outside said drum and for isolating said secondary, atmospheric air flow from said mixing zone, the mixing zone occupying the annulus between said secondary air tube means and the drum; and means for introducing liquid asphalt material into said mixing zone.

2. Apparatus according to claim 1 further comprising means for introducing recycle asphalt material into said drum downstream of said burner head and into said mixing zone whereby the recycle asphalt material so introduced will not pass into said stream of hot gases directed in the upstream direction from said burner head.

3. Apparatus for manufacturing an asphaltic composition, comprising:

a drum cylinder supported for rotation about a longitudinal axis of the drum cylinder and having an inlet end and an outlet end at axially opposite ends of the drum cylinder, the drum cylinder having means for moving aggregate materials for the asphaltic composition in response to rotation of the drum cylinder generally axially downstream away from the inlet end and toward the outlet end of the drum cylinder, a heating and drying region adjacent the upstream inlet end, and axially downstream therefrom a mixing zone;

means for rotating the drum cylinder about the longitudinal axis thereof;

means disposed at, and receiving, the upstream inlet end of the drum cylinder for feeding aggregate material into the inlet end and for exhausting gases at the upstream inlet end from the drum cylinder;

means disposed at, and receiving, the downstream outlet end of the drum cylinder for discharging material from the drum cylinder;

means, penetrating the material discharging means at the outlet end of the drum cylinder and extending centrally along the longitudinal axis into the drum cylinder through the mixing zone of the drum cylinder and forming an annular space with the drum cylinder for the mixing zone and having an innermost end disposed at the heating and drying region and including a burner head at the innermost end, for establishing atmospheric air communication within said drum cylinder at the burner head and away from the annular space of the mixing zone and for generating a hot gas stream at the innermost end within the drum cylinder to flow in an upstream direction toward the inlet end and be exhausted from the drum cylinder at the inlet end of the drum cylinder; and means for introducing liquid asphalt material into the annular space forming the mixing zone of the drum cylinder at a location downstream from said burner head to be mixed with aggregate material within the annular mixing zone of the drum cylinder separate from atmospheric air communication and removed from the hot gas stream.

4. Apparatus according to claim 3, further comprising means for introducing recycle asphalt material into said drum cylinder downstream of said burner head and into said mixing zone, whereby the recycle asphalt material is mixed within said mixing zone downstream from the atmospheric air communication and the generated hot gas stream.

5. Apparatus according to claim 3, wherein the means for establishing atmospheric air communication within said drum cylinder at the burner head and for generating the hot gas stream comprises a secondary air tube, a primary air tube to provide primary air to the burner head disposed within the secondary air tube and coupled at one end thereof to the burner head within the drum cylinder, a blower coupled to the other end of the primary air tube, and means disposed within the secondary air tube for supplying fuel to the burner head.

6. Apparatus according to claim 5, further comprising means for introducing recycle asphalt material into said annular space forming the mixing zone of the drum cylinder at a location downstream of said burner head.

7. A drum mixer for manufacturing an asphaltic composition, comprising:

an inclined cylindrical rotatable drum having an upper inlet end and a lower discharge end, and including means for advancing aggregate materials for inclusion in the asphaltic composition to move in a generally longitudinal, downstream direction away from the upper inlet end and toward the lower discharge end in response to rotation of said drum, said means for advancing aggregate materials including first flighting means for creating a falling curtain of said aggregate materials in an upstream portion of the drum, second flighting means for mixing and stirring said aggregate materials disposed in a downstream portion of the drum adjacent to the lower discharge end, and third flighting means disposed downstream of said first flighting means and upstream of said second flighting means for confining said aggregate materials generally to the inner wall of the drum;

means for rotating said drum;

a burner head disposed within said drum intermediate said upper inlet and lower discharge ends upstream of said second flighting means, to divide said drum into a heating zone upstream from said burner head and a mixing zone downstream from said burner head;

first housing means disposed to receive the upper inlet end for introducing virgin aggregate material into said heating zone of said drum for movement in said downstream direction towards said discharge end;

second housing means disposed to receive the lower discharge end for discharging said asphaltic composition from said drum;

means for producing a flame at said burner head, said flame generating a hot gas stream directed towards the upper inlet end through said heating zone in an upstream direction and in a counterflow direction with respect to the downstream movement of said virgin aggregate material to expose and heat said virgin aggregate material by said directed hot gas stream in said heating zone, and with said stream of hot gases being directed away from said mixing zone;

an air conduit, disposed to penetrate said second housing means and extend longitudinally into said drum, for establishing atmospheric, secondary air communication from outside the drum to flow to said burner head within said drum from outside said drum, the air conduit forming with said drum an annular space comprising said mixing zone, thereby separating said atmospheric secondary air flow from said mixing zone; and means for introducing liquid asphalt material into said drum at a location downstream from said burner head and into said mixing zone.

8. The mixer recited in claim 7, wherein the air conduit contains centrally a forced air supply which is disposed longitudinally with the drum and is coupled to the burner head to supply primary combustion air to the burner head.

9. The mixer recited in claim 8 wherein the air conduit contains a fuel line which passes through the mixing zone.

10. The mixer recited in claim 7 wherein the mixing zone is disposed between outer surface portions of the air conduit and the inner surface portions of the drum and a liquid asphalt injection tube extends through the second housing means into the mixing zone.

11. The mixer recited in claim 7 wherein the air conduit further contains a forced air and fuel lines communicating with the burner head, and a screw conveyor for feeding mineral fines into the drum is disposed beneath the air conduit and penetrates the second housing means to terminate within the mixing zone of the drum.

12. A drum mixer for manufacturing an asphaltic composition from aggregate materials and asphaltic materials, comprising:

a drum cylinder having a material inlet end and a material outlet end, means for advancing aggregate materials for said asphaltic composition generally axially longitudinal through the drum cylinder from the inlet end in a downstream direction to the outlet end in response to rotation of the drum cylinder about said longitudinal axis thereof;

means for mounting the drum cylinder for rotation about a longitudinal axis through the drum cylinder and for rotating the drum cylinder;

a substantially closed feed housing disposed about the inlet end of the drum cylinder, the feed housing having a circular first opening therein for receiving the inlet end of the drum cylinder, a bearing seal attached to the feed housing to permit rotation of the drum cylinder within the feed housing, a second opening and means for receiving aggregate materials through said second opening and for feeding said received materials to the inlet of the drum cylinder, and a third opening functioning as exhaust port for exhausting gases from the drum cylinder;

a discharge housing disposed about the outlet end of the drum cylinder, the discharge housing having a circular first opening therein for receiving the outlet end of the drum cylinder, a bearing seal attached to the feed housing to permit rotation of the drum cylinder within the discharge housing and having a second, discharge opening for discharging said asphaltic composition from the outlet end of the drum cylinder;

a burner head disposed intermediate the inlet and outlet ends within the drum and oriented to direct a stream of hot combustion gases from the burner head into the drum in a direction upstream toward the inlet end of the drum cylinder and forming a heating zone for advanced aggregate materials within the drum upstream of the burner head, the gases of the hot gas stream being exhausted from the inlet end of the drum cylinder through the exhaust port of the feed housing;

a forced air tube and a fuel line extending into the drum cylinder to the burner head, forced air supplied through the forced air tube capable of atomizing fuel supplied to the burner head and supporting a radiant flame of hot combustion gases at the burner head, and a blower of forced air coupled to an outer end of said forced air tube to maintain a flame at the burner head; and a secondary air tube penetrating the discharge housing and extending about the longitudinal axis of the drum cylinder through the discharge housing into the drum cylinder to terminate at the burner head, the secondary air tube communicating and confining therein an atmospheric air flow through the drum cylinder downstream of the burner head and defining an annular mixing zone in a space between the secondary air tube and the drum cylinder downstream of the burner head for mixing advanced aggregate materials with asphaltic materials, separated from a flow of atmospheric air to and past the burner head and further effectively isolated and positionally removed from the hot gas stream upstream of the burner head within the drum cylinder.

13. The drum mixer according to claim 12, comprising a liquid asphalt injection tube extending into the drum cylinder longitudinally adjacent to the secondary air tube into the annular mixing zone, the liquid asphalt injection tube being connected externally of the drum cylinder to a liquid asphalt supply for spraying liquid asphalt into the annular mixing zone separated from air flow and effectively isolated from the hot gas stream.

14. The drum mixer according to claim 12 comprising a recycle feed assembly disposed downstream of the burner head including an external recycle materials feed chute and means for feeding recycle asphaltic materials through the drum cylinder into the annular mixing zone downstream of the burner head to be mixed with advanced aggregate materials separate from air flow and effectively isolated from the hot gas stream passing through the heating zone of the drum cylinder.

15. The drum mixer according to claim 14 further comprising a liquid asphalt injection tube extending into the drum cylinder adjacent to the secondary air tube and terminating within the annular mixing zone, the liquid asphalt injection tube being coupled to a liquid asphalt supply for spraying liquid asphalt into the annular mixing zone to be mixed with advanced aggregate materials and recycle asphaltic materials separate from air flow and effectively isolated from the hot gas stream passing through the heating zone of the drum cylinder.

16. The drum mixer according to claim 15, wherein the heating zone of the drum cylinder comprises combustion flights adjacent and upstream from the burner head, the combustion flights being shaped to maintain the advancing aggregate materials generally adjacent to an inner surface of the drum cylinder within a flame zone of the heating zone, and flights for creating a falling current of aggregate materials, disposed within the drum cylinder upstream of the combustion flights, and wherein the forced air tube and the fuel line extend into the drum cylinder through the secondary air tube.

* * * * *